(12) United States Patent
Huang et al.

(10) Patent No.: US 7,973,967 B2
(45) Date of Patent: Jul. 5, 2011

(54) PSEUDO-MULTITHREAD FRAMEWORK FOR XPSDRV FILTER PIPELINE

(75) Inventors: Hung Huang, Irvine, CA (US); Loren Wood, Lakewood, CA (US); Charles Armstrong, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1051 days.

(21) Appl. No.: 11/560,715

(22) Filed: Nov. 16, 2006

(65) Prior Publication Data

US 2008/0120615 A1    May 22, 2008

(51) Int. Cl.
*G06F 15/00* (2006.01)
*G06K 1/00* (2006.01)
*G06K 15/00* (2006.01)

(52) U.S. Cl. ......... 358/1.9; 358/2.1; 358/1.13; 358/1.15

(58) Field of Classification Search .......... 358/1.1, 358/1.9, 1.11–1.18, 2.1
See application file for complete search history.

(56) References Cited

U.S. PATENT DOCUMENTS

| | | | |
|---|---|---|---|
| 2004/0105114 A1* | 6/2004 | Tomomatsu | 358/1.13 |
| 2004/0111418 A1* | 6/2004 | Nguyen et al. | 707/100 |
| 2004/0156070 A1* | 8/2004 | Gassho | 358/1.14 |
| 2005/0210227 A1 | 9/2005 | Emerson et al. | |

OTHER PUBLICATIONS

Felis Maxa, Feng Yue, Developing XPSDrv Print Drivers, Microsoft Powerpoint, WinHEC May 23-May 25, 2006.
The XPSDrv Filter Pipeline, Whitepaper, Microsoft Corporation, Nov. 3, 2005.

* cited by examiner

*Primary Examiner* — Thierry L Pham
(74) *Attorney, Agent, or Firm* — Canon USA, Inc. IP Division (57) ABSTRACT

A method is provided for allowing a single threaded filter in a print driver to execute feature commands in a parallel mode, thereby creating a pseudo-multithreaded infrastructure which decreases overall processing latency for a print job. The method includes getting and parsing a document sequence print ticket for a document sequence for the print job; creating a feature command list of document sequence scoped feature commands based on the document sequence print ticket; getting a document part and parsing a document print ticket for the document part; inserting document scoped feature commands, based on the document print ticket, in the front of the feature command list; getting a page part and parsing a page print ticket for the page part; inserting page scoped feature commands, based on the page print ticket, in the front of the feature command list; and sequentially executing the feature commands in the feature command list.

14 Claims, 12 Drawing Sheets

XPS Spool File Format

Printing Intent: 2-up and Apply watermark on logical page

FIG. 10B

Printing Intent: 2-up and Apply watermark on physical page

FIG. 10C

Printing Intent: Booklet and Watermark

PSEUDO-MULTITHREAD FRAMEWORK FOR XPSDRV FILTER PIPELINE

BACKGROUND OF THE INVENTION

1. Field of the Invention

The present invention relates to an improvement to the Microsoft® Windows® family of operating systems, and in particular, to the addition of a pseudo-multithread framework to the filter pipeline of an XPSDrv print driver.

2. Description of the Related Art

Recently, Microsoft Corporation has introduced the Microsoft® Windows Vista™ operating system. One of the new features of this operating system is the XPS print path which includes a print architecture that is designed to improve support for printing and document processing.

In particular, print jobs that are processed through the XPS print path are processed by a print driver (referred to as the "XPSDrv" print driver) which includes a filter pipeline (referred to as the "XPSDrv Filter Pipeline"). The XPSDrv print driver and print path processing are described in greater detail in the Microsoft® Windows® whitepaper entitled "The XPS-Drv Filter Pipeline", published Nov. 3, 2005 (see http://www.microsoft.com/whdc/).

Figure 1A:
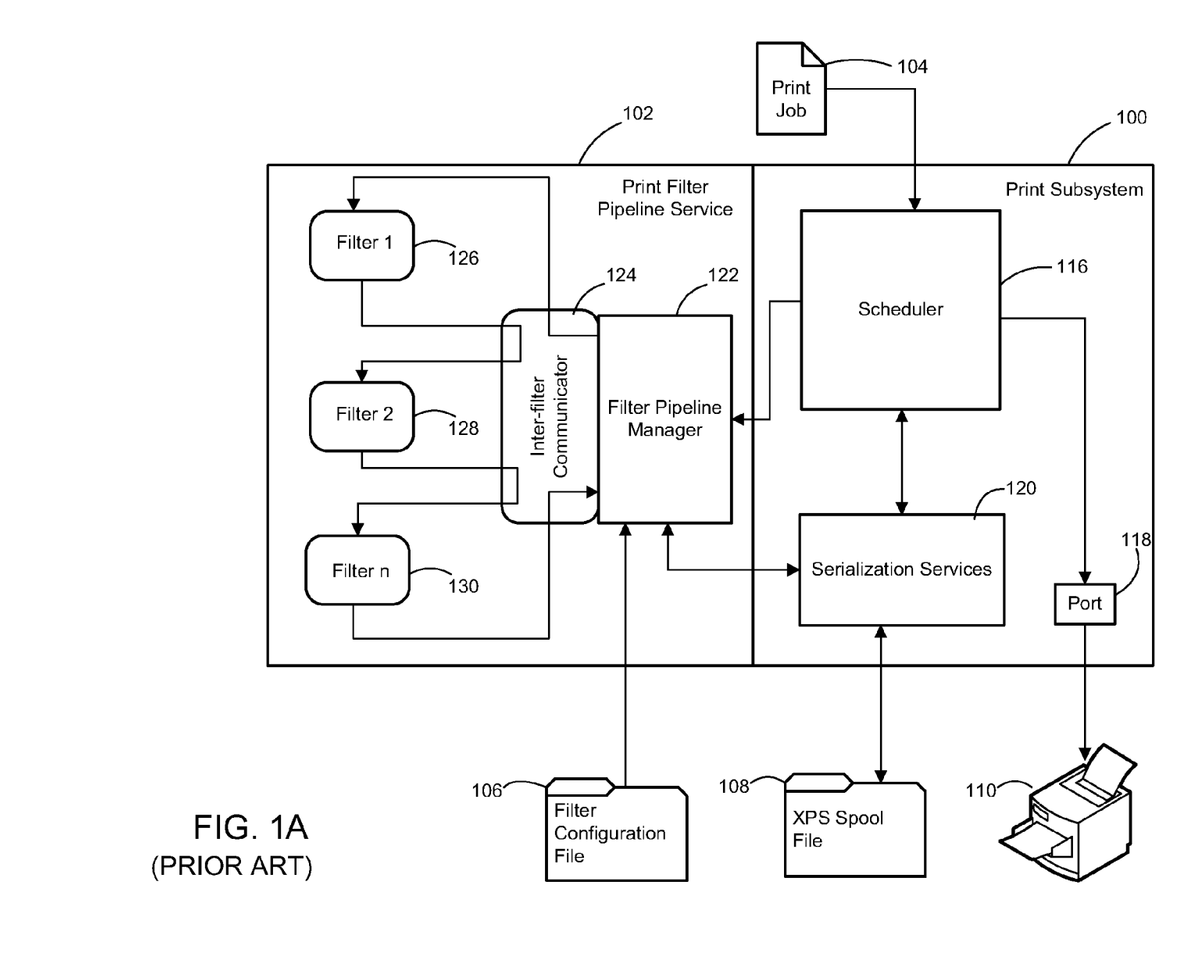

FIG. 1 illustrates system components of the conventional XPS print path which includes the XPSDrv print driver. The XPSDrv print driver further includes the XPSDrv Filter Pipeline which is considered the main processing feature of the XPSDrv print driver. Here, the system components include a print subsystem module 100 which includes a scheduler 116, a port 118 and serialization services 120. Also, a print filter pipeline service module 102 is provided which includes a filter pipeline manager 122, an inter-filter communicator 124, and a series of filters 126, 128, 130 (e.g., Filters 1-n). In addition, the XPS print path utilizes a filter configuration file 106, an XPS spool file 108 and a printer 110 or the like.

The creation of a typical XPSDrv filter pipeline will now herein be described in greater detail. A print job 104 is received into the print subsystem module 100 where the print job 104 is spooled by a print spooler and a spool file for the job is created in the XPS spool file 108. After documents have been spooled into an XPS spool file 108 and the job is ready to print, the scheduler 116 signals the filter pipeline manager 122 to begin processing. The filter pipeline manager 122 then reads the filter configuration file 106 and loads the filters that are listed in the configuration file 106. Next, the filter pipeline is initialized.

Thereafter, the filter pipeline manager 122 begins the filter pipeline process wherein the first filter 126 (Filter 1) in the filter pipeline reads the contents of the XPS spool file 108 for the specific job. Here, the first filter 126 reads the document parts and XML PrintTickets (print ticket), and performs processing to the document. Then, the filter 126 sends the processed document parts to the next filter 128 in the pipeline (Filter 2). This process is facilitated by using the interfilter communicator (IFC) 124, which retains intermediate processing results until the next filter in the pipeline is available.

When the next filter 128 in the pipeline is ready, it reads the document parts that the previous filter 126 processed. After the data is processed, the results are written back to the interfilter communicator 124. This process is performed for each filter (1-n) in the filter pipeline. After each filter processing is complete, the output from the last filter 130 (Filter n) is sent to the port 118 defined by the printer driver such that a document may be printed via the printer 110, or the like.

As discussed above, the XPS spool file 108 for the job is fed to the filters (1-n). It is noted that the XPS spool file 108 is defined by a hierarchical set of document parts that describe different aspects of the content of the document. In particular, the XPS spool file typically includes a Fixed Document Sequence object, Fixed Document objects, and Fixed Page objects.

Figure 1B:
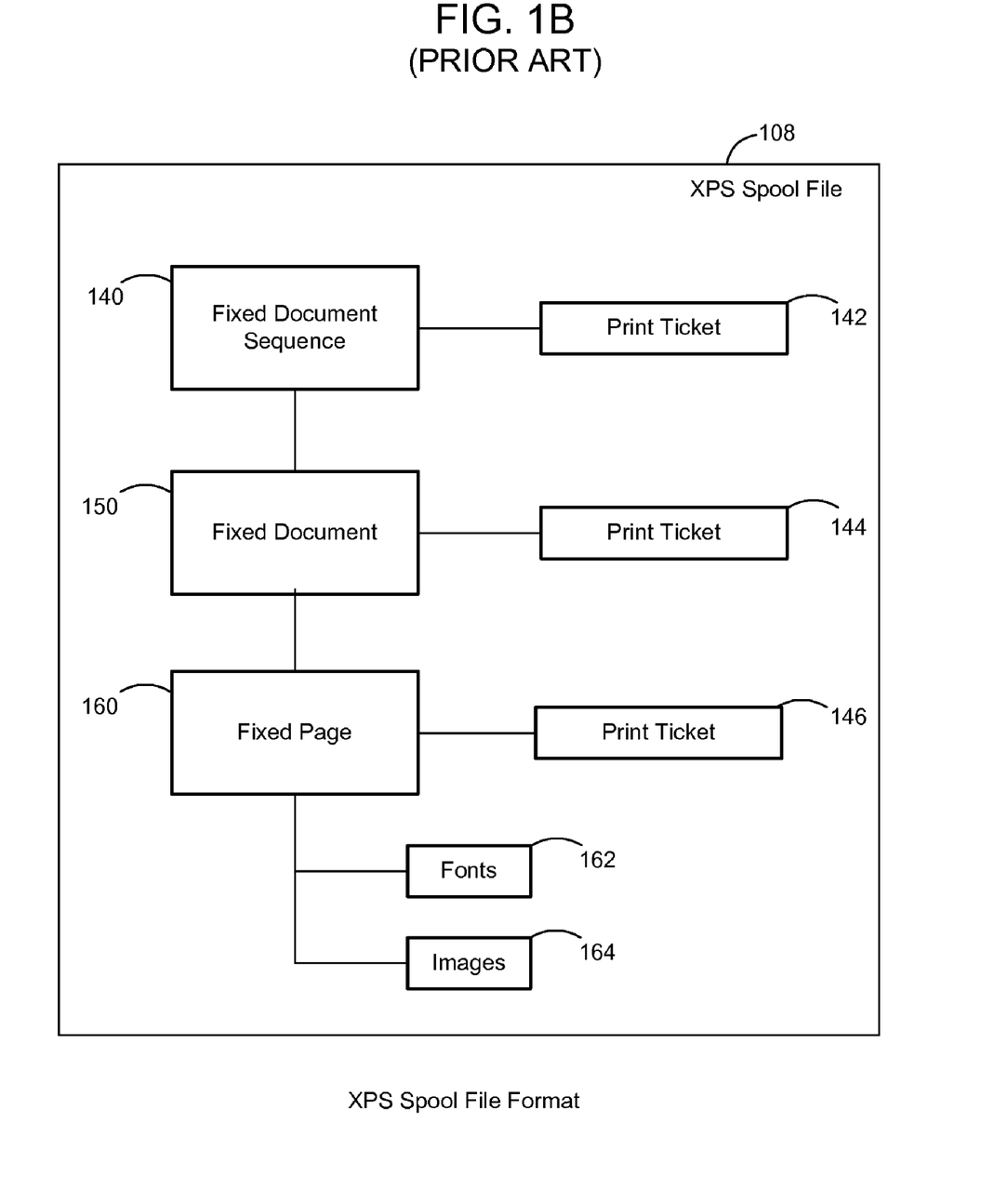
FIG. 1B illustrates a conventional XPS spool file format.

FIG. 1B is provided to illustrate the typical relation between a Fixed Document Sequence 140 object, Fixed Document 150 objects, and Fixed Page 160 objects. An XPS spool file 108 contains only one Fixed Document Sequence 140. The Fixed Document Sequence 140 contains one or more Fixed Documents 150 and may or may not contain a print ticket 142, which specifies the print settings for a print job, Fixed Document 150 or a Fixed Page 160. Further, a Fixed Document 150 contains one or more Fixed Pages and may or may not contain a print ticket. And also, a Fixed Page 160 contains resources (e.g., fonts 162, images 164) and may or may not contain a print ticket 146.

Although the overall performance of the XPSDrv print drivers for the Microsoft® Windows® family of operating systems provides a viable new print architecture that improves support for printers and document processing, it is noted, however, that there is an inherent processing restriction indigenous to the XPSDrv Filter Pipeline environment.

In particular, the filters in the pipeline 126, 128, 130 (1-n) are not recommended to spawn threads, meaning that, within a filter all processing has to performed in a sequential (single threaded) mode. As a result, since the filtering is performed sequentially, the overall processing time for the print job inherently has some undesired latency. That is to say, the filters in the pipeline 126, 128, 130 (1-n), and their order of execution, are statically defined by the XPSDrv print driver's filter configuration file 106, meaning that, filters in the pipeline and their order of execution cannot be dynamically changed based on the print ticket settings. As a result, the XPSDrv print driver's document processing can not be optimized for the print job and processing time for print jobs is increased.

Therefore, it would be advantageous to enhance the XPS-Drv print driver for the Microsoft® Windows Vista™ operating system by adding and/or modifying software features which will help speed up the overall processing time for the print job even though filtering is performed sequentially.

SUMMARY OF THE INVENTION

Accordingly, an aspect of the present invention is to enhance the Microsoft®Windows®family of operating systems, and more particular, to add a pseudo-multithread framework for the XPSDrv Filter Pipeline. As a result of the aforementioned the addition of the pseudo-multithread framework to the XPSDrv Filter Pipeline, even though filtering is performed sequentially, the overall processing time for the print job will be reduced (i.e. latency).

According to an aspect of the present invention a method is provided for allowing a single threaded filter in a print driver to execute feature commands in a parallel mode, thereby creating a pseudo-multithreaded infrastructure which decreases overall processing latency for a print job. The method includes getting and parsing a document sequence print ticket for a document sequence for the print job; creating a feature command list of document sequence scoped feature commands based on the document sequence print ticket; getting a document part and parsing a document print ticket for the document part; inserting document scoped feature commands, based on the document print ticket, in the front of the feature command list; getting a page part and parsing a page print ticket for the page part; inserting page scoped feature commands, based on the page print ticket, in the front of the feature command list; and sequentially executing the feature commands in the feature command list.

According to another aspect of the present invention, the method may further include removing the page scoped feature commands from the feature command list; and determining whether there are any more page parts that need to be processed.

According to yet another aspect of the present invention, if there are more page parts to be processed, the method may further include performing another page parts processing sequence which includes getting another page part and parsing a respective page print ticket for the respective page part; inserting respective page scoped feature commands, based on the respective page print ticket, in the front of the feature command list; sequentially executing feature commands in the feature command list; removing the respective page scoped feature commands from the feature command list; and determining whether there are any more page parts that need to be processed.

Moreover, according to another aspect of the present invention the method may further include removing the document scoped feature commands from the feature command list; and determining whether there are any more document parts that need to be processed.

According to another aspect of the present invention, if there are more document parts to be processed, the method may further include performing another document part processing sequence which includes, getting another document part and parsing a respective document print ticket for the respective document part; inserting respective document scoped feature commands, based on the respective document print ticket, in the front of the feature command list; getting a page part and parsing a respective page print ticket for the page part; inserting page scoped feature commands, based on the page print ticket, in the front of the feature command list; sequentially executing feature commands in the feature command list; removing the page scoped feature commands from the feature command list; removing the respective document scoped feature commands from the feature command list; and determining whether there are any more document parts that need to be processed.

Additionally, according to yet another aspect of the present invention, the method may further include removing the document sequence scoped feature commands from the feature command list.

According to still yet another aspect of the present invention a dynamic feature command filter unit functions as an interface with the print driver; and a feature command manager functions as an interface with the dynamic feature command filter.

Moreover, according to another aspect of the present invention, the feature command manager implements the pseudo-multithread infrastructure using feature commands that are processable in parallel. Furthermore, according to an aspect of the present invention, the feature commands comprise at least one of an input feature command, a page feature command, a feature command having a specialized function, and an output feature command.

Additionally, according to yet another aspect of the present invention, the printer driver may be an XPSDrv print driver including an XPSDrv filter pipeline utilized within a Microsoft® Windows® operating system, for example, Windows Vista™, Windows XP, or Windows Server™ 2003.

Furthermore, according to still yet another aspect of the present invention, the method may also include dynamically reconfiguring the feature command list during processing based on the print ticket settings. And also, according to another aspect of the present invention, the method may also include configuring a "time slice" for each feature command based on a number of pages required by a subsequent feature command.

Additionally, according to yet another aspect of the present invention, a computer readable medium is provided containing computer-executable instructions for allowing a single threaded filter in a print driver to execute feature commands in a parallel mode, thereby creating a pseudo-multithreaded infrastructure which decreases overall processing latency for a print job. Here, the computer readable medium includes computer-executable instructions for getting and parsing a document sequence print ticket for a document sequence for the print job; computer-executable instructions for creating a feature command list of document sequence scoped feature commands based on the document sequence print ticket; computer-executable instructions for getting a document part and parsing a document print ticket for the document part; computer-executable instructions for inserting document scoped feature commands, based on the document print ticket, in the front of the feature command list; computer-executable instructions for getting a page part and parsing a page print ticket for the page part; computer-executable instructions for inserting page scoped feature commands, based on the page print ticket, in the front of the feature command list; and computer-executable instructions for sequentially executing the feature commands in the feature command list.

Accordingly, the addition of the pseudo-multithread framework to the Microsoft® Windows® family of operating system, and in particular to the XPSDrv Filter Pipeline, will enable the execution of Feature Commands in a "parallel" mode in a single threaded filter. Moreover, dynamic reconfiguration will be able to be performed with regard to a Feature Command List during processing based on the print ticket settings. Furthermore, the improvement will allow configuration of a "time slice" for each Feature Command based on the number of pages required by the subsequent Feature Command.

Further embodiments, features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

FIG. 1A illustrates the architecture of the conventional XPS print path which includes the XPSDrv print driver and XPSDrv filter pipeline, while.

DETAILED DESCRIPTION OF THE EMBODIMENTS

Exemplary embodiments, features and aspects of the present invention will now be herein described in detail below with reference to the drawings.

The present invention provides an improvement to the XPSDrv print drivers for the Microsoft® Windows®, and in more particular, provides the additional component/feature of a pseudo-multithread architecture/framework for the XPS-Drv Filter Pipeline. This infrastructure will allow Feature Commands (to be described in greater detail) to be executed in "parallel", without the need to spawn threads (which is not recommended in the current XPSDrv Filter Pipeline environment).

Moreover, according to another aspect of the present invention, dynamic reconfiguration will be able to be performed with regard to a Feature Command List during processing based on the print ticket settings.

Furthermore, according to another aspect of the present invention, the improvement will allow configuration of a "time slice" for each Feature Command based on the number of pages required by the subsequent Feature Command. This capability to configure the number of pages to be processed by each Feature Command will also improve processing efficiency the overall performance of the XPSDrv print drivers for the Microsoft® Windows® family of operating systems.

According to the present invention, each Feature Command will be given an opportunity to produce one (or more) page(s) before relinquishing the execution to the another Feature Command in the chain. Utilizing this principle, a Dynamic Feature Command Filter (to be discussed later) executing in the XPSDrv Filter Pipeline will be able to produce output pages while the input pages are still being read. In addition, the pseudo-multithread architecture/framework infrastructure will allow a Feature Command List to be created and changed during the processing of a document. Moreover, the Dynamic Feature Command Filter will be given the opportunity to create/modify the Feature Command List in the beginning of each fixed document and fixed page based on the setting specified in the Print Tickets.

[Addition of Exemplary Dynamic Feature Command Filter to Existing XPSDrv Filter Pipeline]

Figure 2A:
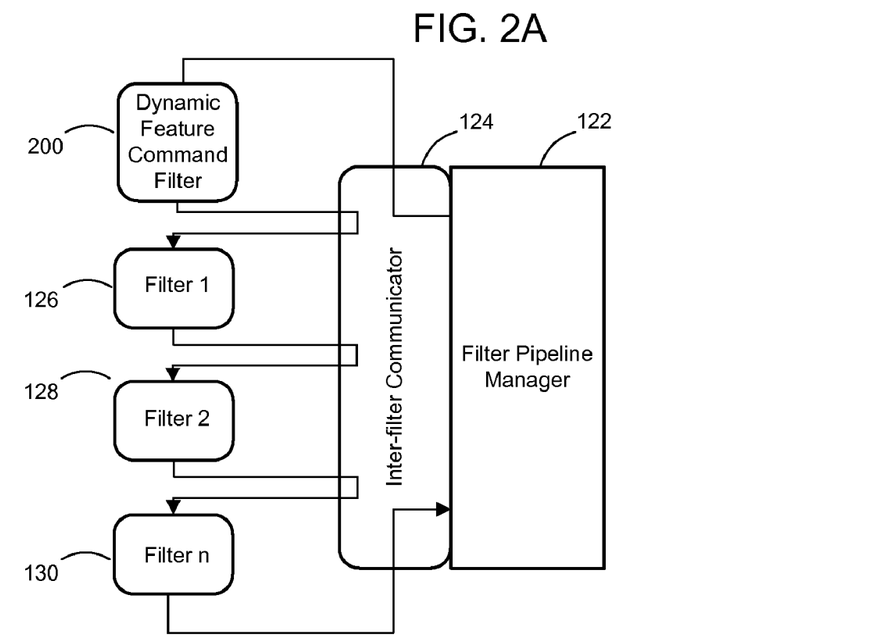
FIGS. 2A-B illustrates exemplary architectures of the XPSDrv print driver and XPSDrv filter pipeline, which includes the addition of a dynamic feature command filter (DFCF), according to an aspect of the present invention.
Figure 2B:
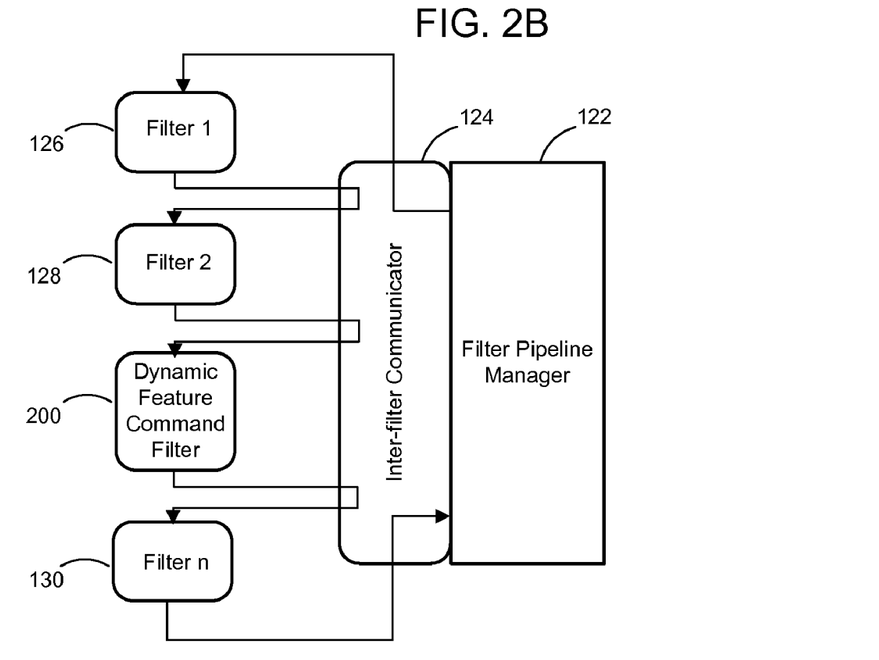

FIGS. 2A-B illustrates exemplary architectures of the XPSDrv print driver and XPSDrv filter pipeline, which includes the addition of a Dynamic Feature Command Filter 200, according to an aspect of the present invention.

FIG. 2A illustrates an embodiment in which the Dynamic Feature Command Filter 200 (hereinafter referred to as "DFCF") is added/integrated in the XPSDrv Filter Pipeline. Here, the system components provided are similar to the conventional XPS print path described in FIG. 1, except for the addition of the DFCF 200 which becomes the first filter in the filter pipeline.

It is further noted that the DFCF 200 may be positioned anywhere in the filter pipeline. Thus, FIG. 2B is provided to illustrate such a scenario, wherein, for example, the DFCF 200 is positioned as the third filter in the XPSDrv Filter Pipeline. Here, as with the previous embodiment, the system components provided are similar to the conventional XPS print path described in FIG. 1, except for the addition of the DFCF 200 which becomes the third filter in the filter pipeline.

[Exemplary Dynamic Feature Command Filter and Feature Command Manager]

Figure 3:
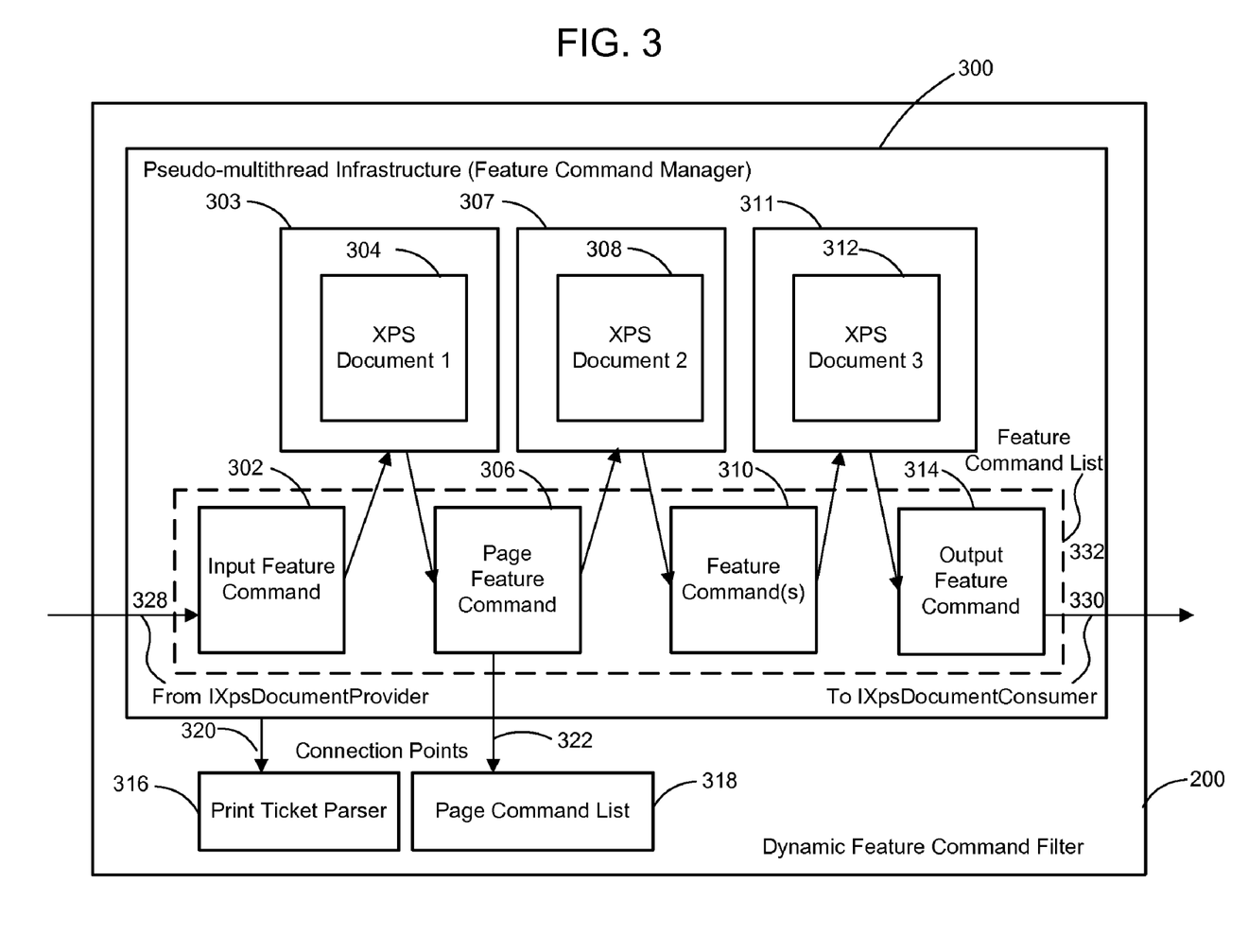
FIG. 3 illustrates an exemplary architecture for the dynamic feature command filter from FIGS. 2A-B, according to an aspect of the present invention.

FIG. 3 illustrates an exemplary architecture and/or framework which implements the pseudo-multithread infrastructure, according to an aspect of the present invention. In particular, the pseudo-multithread infrastructure is accomplished by the addition of the Dynamic Feature Command Filter 200, which further calls up and initializes the Feature Command Manager 300.

The Dynamic Feature Command Filter 200 is initiated and executed by the XPSDrv Filter Pipeline when a print job is ready to be processed. After the DFCF 200 is initiated, the DFCF 200 creates an instance of the Feature Command Manager 300. Further, the DFCF 200 implements a Print Ticket Parser 316 which serves as a connection point 320 that will allow the Feature Command Manager 300 to provide status updates and Print Tickets (e.g., 142, 144, 146) to be parsed. Moreover, the DFCF 200 implements a Page Command List 318 which serves as the connection point 322 to receive and parse the Page Print Tickets (e.g., Print Ticket 146). As a result, the DFCF 200 is able to parse the Print Tickets, using the Print Ticket Parser 316 and Page Command List 318, to determine the operations to be performed.

Still referring to FIG. 3, the DFCF 200 adds the Page Feature Command 306. The DFCF 200 also creates/initializes Feature Command(s) 310 according to the operations requested in the Print Tickets. The creation of the Feature Commands (except the Input Feature Command 302 and Output Feature Command 314, which are created by the FCM 300) is also performed in the Print Ticket Parser 316. And still further, a Feature Command List 332 is created and managed by the FCM 300. The Feature Command List 332 is a list of the Feature Commands to be executed for the print job 104. Thus, the Feature Commands created by the DFCF 200 (for instance, 302, 306, and 310) are added to the Feature Command List 332.

The FCM 300 provides still further a variety of functions. For example, the FCM 300 calls the Print Ticket Parser 316 connection point 320 at the beginning of each Fixed Document 150. Still further, the FCM 300 creates an Input Feature Command 302 which reads the XPS parts from the IXps-DocumentProvider Interface 328, which is an interface defined by Microsoft that provides access to the objects in the XPS Spool File 108. The FCM 300 also creates the XPS Documents (for example 304, 308, 312). Moreover, the FCM 300 creates the Output Feature Command 314 which writes the modified XPS parts back to an IXpsDocumentConsumer Interface 330.

Additionally, the FCM 300 controls the execution of the Feature Commands (for example 302, 306, 310 and 314) in a round-robin scheduling fashion, for example, until all the Feature Commands (for example 302, 306, 310, 314) indicate that they have completed their tasks. For instance, round-robin scheduling may be implemented by assigning time slices to each Feature Command process in equal portions and in order, handling all Feature Command processes without priority; thereby, resulting in starvation-free processing.

The initialization of the Feature Commands (for example 302, 306, 310 and 314) includes initializing the Feature Commands with the number of pages to produce at each turn which allows the optimization of the execution of the Feature Commands. Also, it is noted that the number of pages to produce for each Feature Command is obtained from the subsequent Feature Command.

Still further, Metro Packages/Tool Kits 303, 307 and 311 are provided as interfaces (High Level Metro Toolkit Interface) that contain an uncompressed/unpackaged XPS Documents (for instance 304, 308, 312). In particular, the Metro Packages (for example 303, 307, 311) are based from an XPS Document Object Model providing a high level, logical representation of XPS Document, wherein underneath each object of the Metro Package is a reference to the XPS Document part interfaces. The Metro Packages allow the Feature Commands to exchange the intermediate XPS Documents 304, 308, 312 efficiently by moving parts from one XPS Document to another XPS Document without making a copy of the parts and perform operations on the XPS Documents 304, 308, 312. All the Metro packages (for example 303, 307, 311) in the Feature Command List 332 operate on a share copy of uncompressed/unpackaged XPS Document in disk. The Metro packages/toolkits 303, 307 and 311 are responsible to provide shared access to the parts in the XPS Document. The XPS Documents 304, 308, 312 are uncompressed/unpackaged (by the Input Feature Command 302) and compressed/packaged once (by the Output Feature Command 314).

[Exemplary Feature Commands]

As discussed, the Feature Commands (e.g., 302, 306, 310) perform the requested operations on the XPS Documents (e.g., 304, 308, 312). The Feature Commands create a given number of Fixed Pages and output to the next Feature Command through an XPS Document (for example 304, 308, 312) before returning (i.e., relinquishing the control back to the pseudo-multithread infrastructure). The number of pages to be created each time is set during the initialization of the subject Feature Command.

According to the present invention, the pseudo-multithread infrastructure defines/provides various Feature Commands, including the Input Feature Command 302, an Output Feature Command 314, a Page Feature Command 306, and other Feature Commands 310 which perform desired functions. That is to say, that any combination and permutation of Feature Commands may be developed to accomplish (i.e., customizable) various functions and/or tasks desired to accomplish an effect.

The Input Feature Command 302 is responsible for retrieving the XPS Document parts from the Interface IXpsDocumentProvider Interface 328 which is an interface that retrieves the parts in the XPS Spool File 108 and adds them to the XPS Document 304 connected to the Input Feature Command 302 output.

The Output Feature Command 314 is responsible for sending the XPS Document parts produced in the XPS Document 312 (connected to the Output Feature Command 314 input) to the IXpsDocumentConsumer 330 that allows a Filter (e.g., 126, 128, 130) to pass an XPS Document back to the Filter Pipeline Manager 122.

The Page Feature Command 306 is responsible for calling the DFCF 200 Page Command List 318 connection point 322 at the beginning of a Fixed Page to allow the DFCF 200 to create a Page Feature Command List 324 to perform the actions specified in the Page Print Ticket 326. This allows the DFCF 200 to modify the Feature Command List for each Fixed Page.

Figure 9:
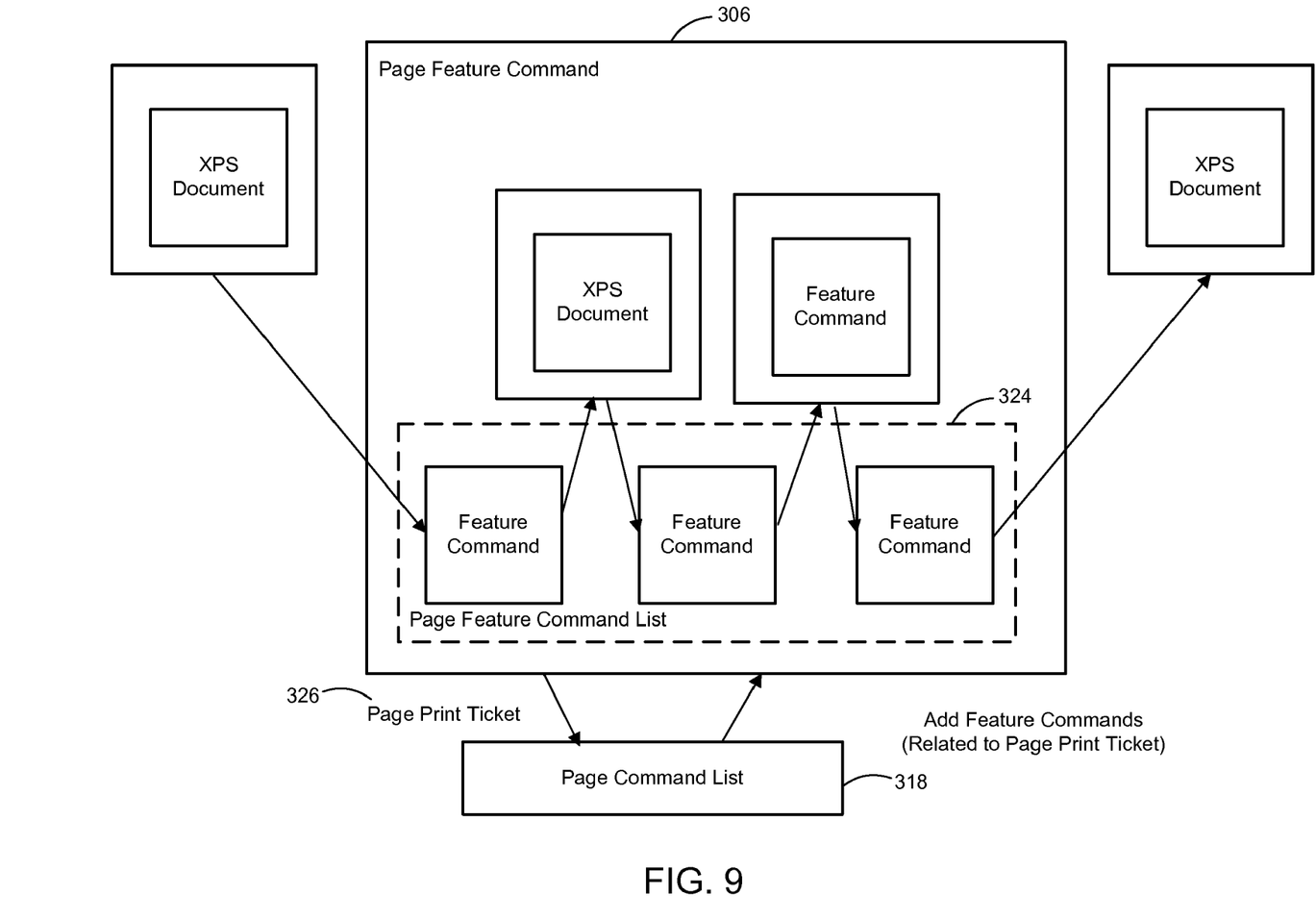
FIG. 9 illustrates an exemplary Page Feature Command function, according to an aspect of the present invention.

FIG. 9 illustrates an exemplary Page Feature Command operation, according to an aspect of the present invention. Page Feature Command 306 creates a Page Feature Command List 324 (if it not already created). The Page Command List 318 parses the Page Print Ticket 146. Based on the parsing results, the Page Command List 318 creates and adds the necessary Feature Commands to the Page Feature Command List 324. The Page Feature Command 306 then executes all the Feature Commands in the Page Feature Command List 324, applying the required transformations to produce the desired effect for the page. The Feature Commands added are removed from list once they complete their operation. The page is then sent to the next XPS Document to be processed by the next Feature Command in the Feature Command List 308.

[Exemplary Sequence of Operations]

Figure 8:
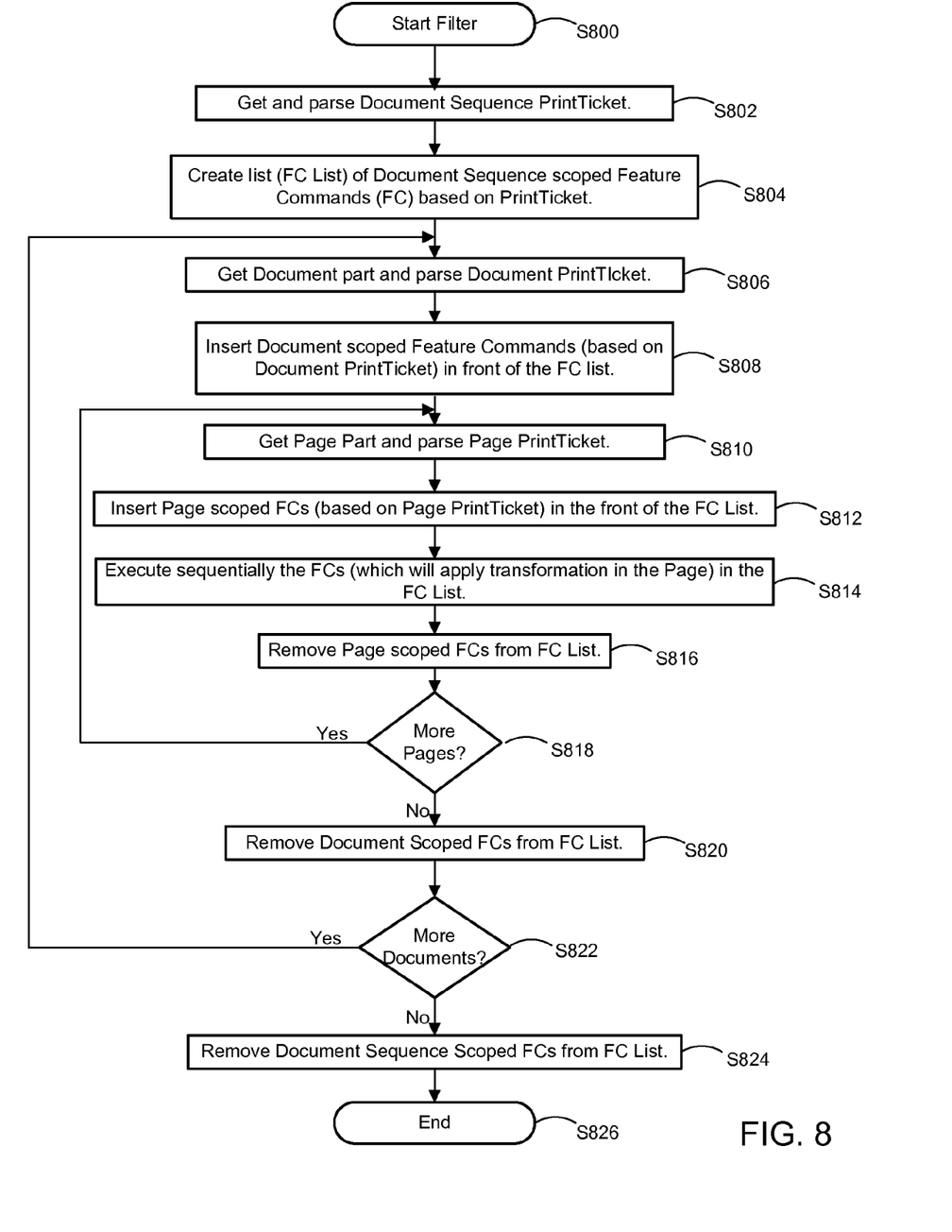
FIG. 8 illustrates an overview process flow, according to an aspect of the present invention.

FIG. 8 illustrates an exemplary overview process flow according to an aspect of the present invention. The pseudo-multithread infrastructure is initiated in step S800, when the Dynamic Feature Command Filter 200 creates an instance of the Feature Command Manager 300 when executed by the Filter Pipeline Manager 122. Then, in step S802, the DFCF 200 gets and parses a Document Sequence Print Ticket 142 for the subject print job 104. Thereafter, in step S804, the DFCF 200 creates a Feature Command List of the Document Sequence 140 scoped Feature Commands for the subject print job 104 based on the Fixed Document Sequence Print Ticket 142.

Then, in step S806, the DFCF 200 gets the Fixed Document 150 and parses the Print Ticket 144. Thereafter, in step S808, the DFCF 200 inserts Fixed Document 150 scoped Feature Commands (based on the Document Print Ticket 144) in the front of the List of Features Commands. Next, in step S810, the DFCF 200 gets the Fixed Page 160 and parses the Print Ticket 146.

And then, in step S812, the DFCF 200 inserts Fixed Page 150 scoped Feature Commands (based on the Document Print Ticket 146) in front of the List of Features Commands. Thereafter, in step S814, the Feature Commands in the Feature Command List are sequentially performed. Then, in step S816, the Feature Commands scoped for the Fixed Page 160 are removed from the Feature Command List. In step S818, it is determined whether there are any more Fixed Pages 160 (or the like) to be processed. If there are no more Fixed Pages 160 to be processed, then the flow moves to step S822; otherwise, the process flow returns to S810.

Next, in step S820, the Feature Commands scoped for the Fixed Document 150 are removed from the Feature Command List. And in step S818, it is determined whether there are any more Fixed Documents 150 (or the like) to be processed. If there are no more Fixed Documents 150 to be processed, then the flow moves to step S824; otherwise, the process flow returns to S806. Then, in step S824, the Feature Commands scoped for the Fixed Document Sequence 140 are removed from the Feature Command List. And in step S826, the process then ends.

[Exemplary Detailed Sequence of Operations]

FIGS. 4-7 are provided to further describe in a more detailed level the flow of an exemplary sequence of operations between the Dynamic Feature Command Filter 200 and the Feature Command Manager 300. A typical sequence of operations may include a Main Sequence (see FIG. 4), an Add Feature Sequence (see FIG. 5), a Page Feature Command Sequence (see FIG. 6), and an Execute Feature Command Sequence (see FIG. 7). The exemplary sequence of operations will now herein be described below.

Exemplary Main Sequence

Figure 4:
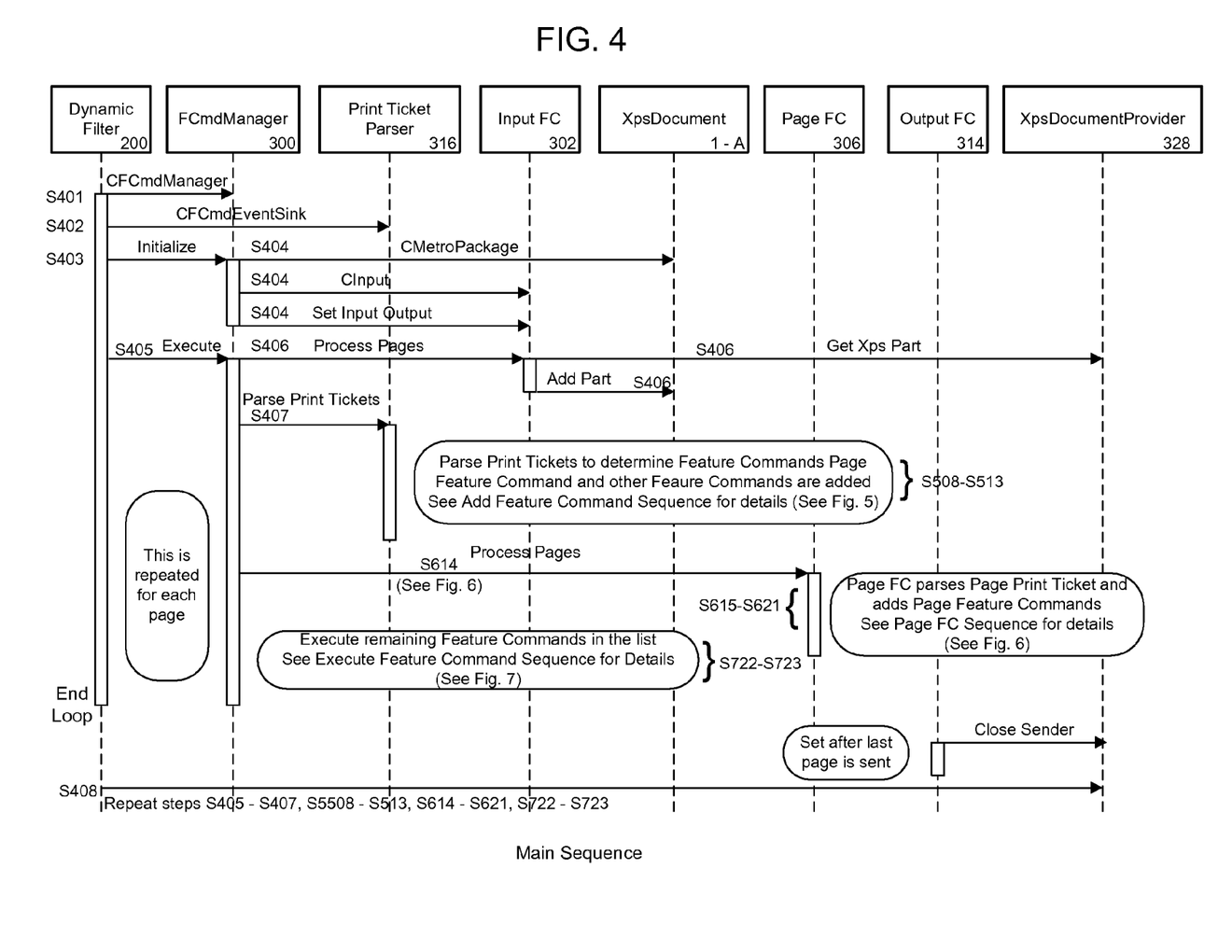
FIG. 4 illustrates an exemplary main sequence of operations between the Dynamic Feature Command Filter (DFCF) and the Feature Command Manager (FCM), according to an aspect of the present invention.

FIG. 4 illustrates an exemplary Main Sequence of operations between the Dynamic Feature Command Filter 200 and the Feature Command Manager 300, according to an aspect of the present invention.

Referring to FIG. 4, initially, the DFCF 200 creates an instance of Feature Command Manager 300 in step S401. In step S402, the DFCF 200 creates an instance of Print Ticket Parser 316 for Connection Point 320. Next, in step S403 the DFCF 200 initializes both instances and assigns the Print Ticket Parser 316 to the Connection Point 320 for the Feature Command Manager 300. In step S404, when the DFCF 200 initializes the FCM 300, the FCM 300 creates an Input Feature Command 302 and adds it to the Feature Command List. Then, in step S405, the DFCF 200 executes FCM 300. Next, in step S406 the FCM 300 executes the Input Feature Command 302 (see FIG. 3), which will read XPS parts from IXpsDocumentProvider 328. Then, in step S407, the FCM 300 calls the DFCF 200's Print Tickets Parser 316 at Connection Point 320 when a document is received.

Exemplary Add Feature Command Sequence

Figure 5:
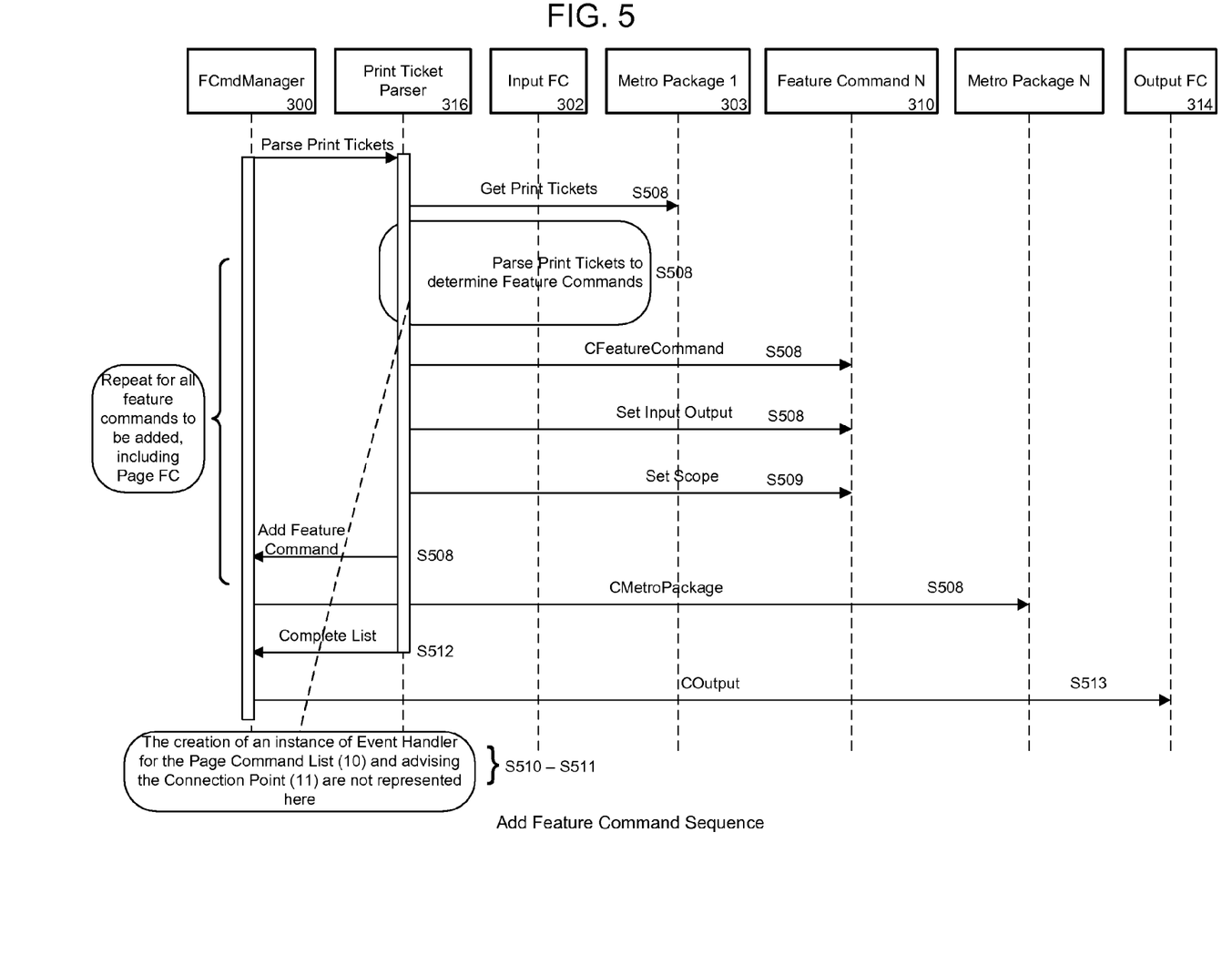
FIG. 5 illustrates an exemplary Add Feature Command Sequence, according to an aspect of the present invention.

FIG. 5 illustrates an exemplary Add Feature Command Sequence, which is the next sequence performed, according to an aspect of the present invention.

Referring to FIG. 5, next in step S508, the DFCF 200 Print Ticket Parser 316 parses the Fixed Document Sequence 140 and Fixed Document 150 Print Tickets 142, 144 and creates an initial Feature Command List based on the Print Tickets. The DFCF 200 will also create/add Page Feature Command 306 as the first Feature Command (if not already added) after Input Feature Command 302 to allow processing of Page Print Tickets 146. Then in step S509, the DFCF 200 sets the scope (Document Sequence, Document or Page) of each Feature Commands. Next, in step S510, the DFCF 200 creates an instance of Page Command List 318 for Connection Point 322. Thereafter, in step S511, the DFCF 200 assigns the Page Command List 318 to the Connection Point 322 for Page Feature Command 306. Then, in step S512, the DFCF 200 finalizes the Feature Command List 332. And then, in step S513, the FCM 300 creates (if not already created) an Output Feature Command 314 (see FIG. 3) and appends it to the Feature Command List 332.

Exemplary Page Feature Command Sequence

Figure 6:
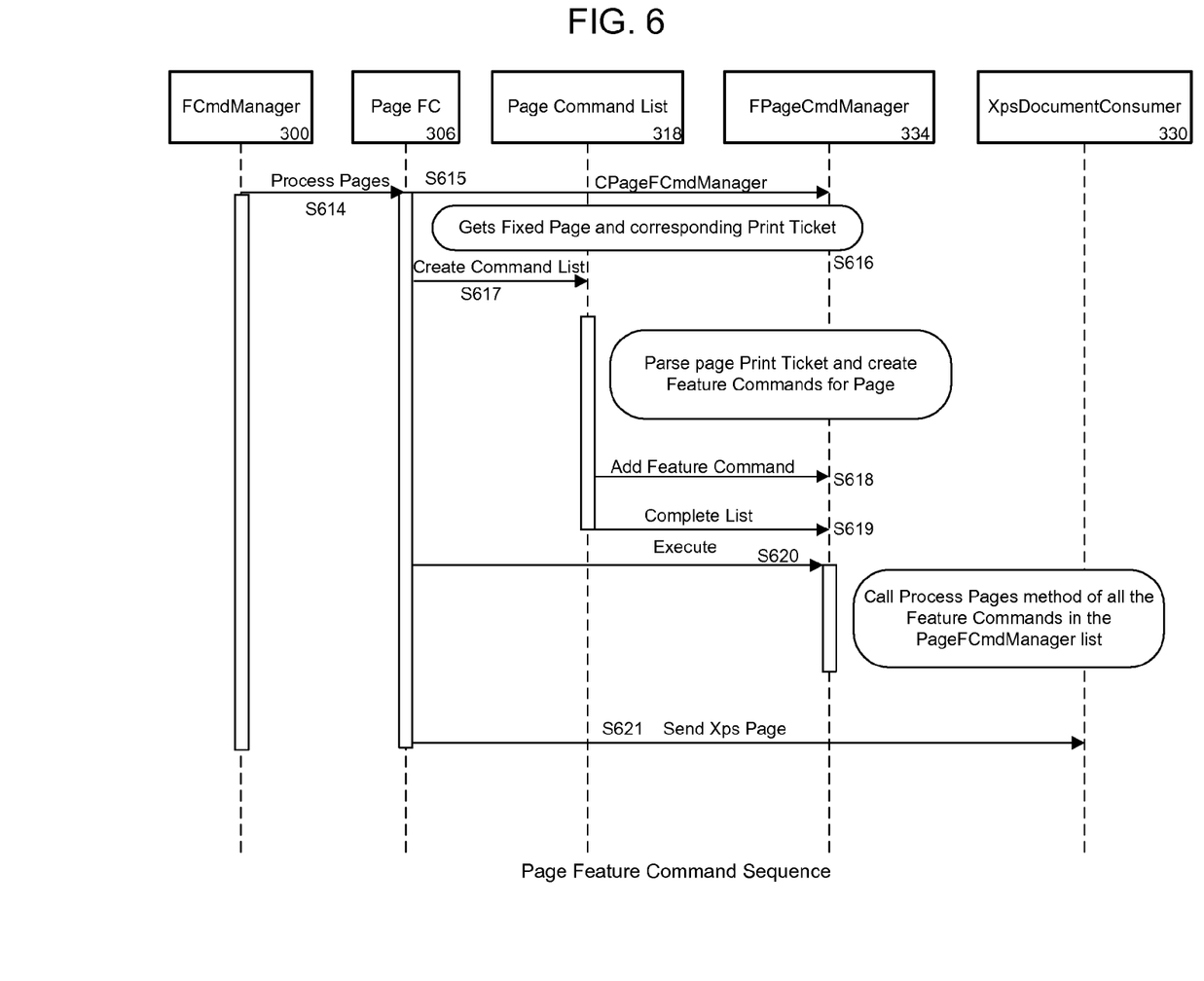
FIG. 6 illustrates an exemplary Page Feature Command Sequence, according to an aspect of the present invention.

FIG. 6 illustrates an exemplary Page Feature Command 306 sequence, which is the next sequence performed, according to an aspect of the present invention.

Now referring to FIG. 6, in step S614, the FCM 300 executes each Feature Command in the Feature Command List 332, typically starting with the Page Feature Command 310 (see FIG. 3) which is added by the DFCF 200. Then, in step S615, the Page Feature Command 310 creates a Page FC Manager instance if not created already. Next, in step S616, the Page Feature Command 310 gets the Fixed Page 160 and its Print Ticket 146 from its input XPS Document 304. Thereafter, in step S617, the Page Feature Command 310 calls the DFCF 200's Page Command List 318. Then, in step S618, the DFCF 200 (in Page Command List 318) validates and parses the Fixed Page Print Ticket 146 and creates a list of additional Feature Commands using a Page Command Manager 334 (see FIG. 6; "FPageCmdManager") if necessary. Next, in step S619, the DFCF 200 finalizes the Page Feature Command List 324. Then, in step S620, the Page Feature Command 310 executes all the Feature Commands in Page Feature Command List 324. Thereafter, in step S621, the Page Feature Command 310 moves the processed Fixed Page 160 from the input XPS Document 304 to the output XPS Document 308.

Exemplary Execute Feature Command Diagram

Figure 7:
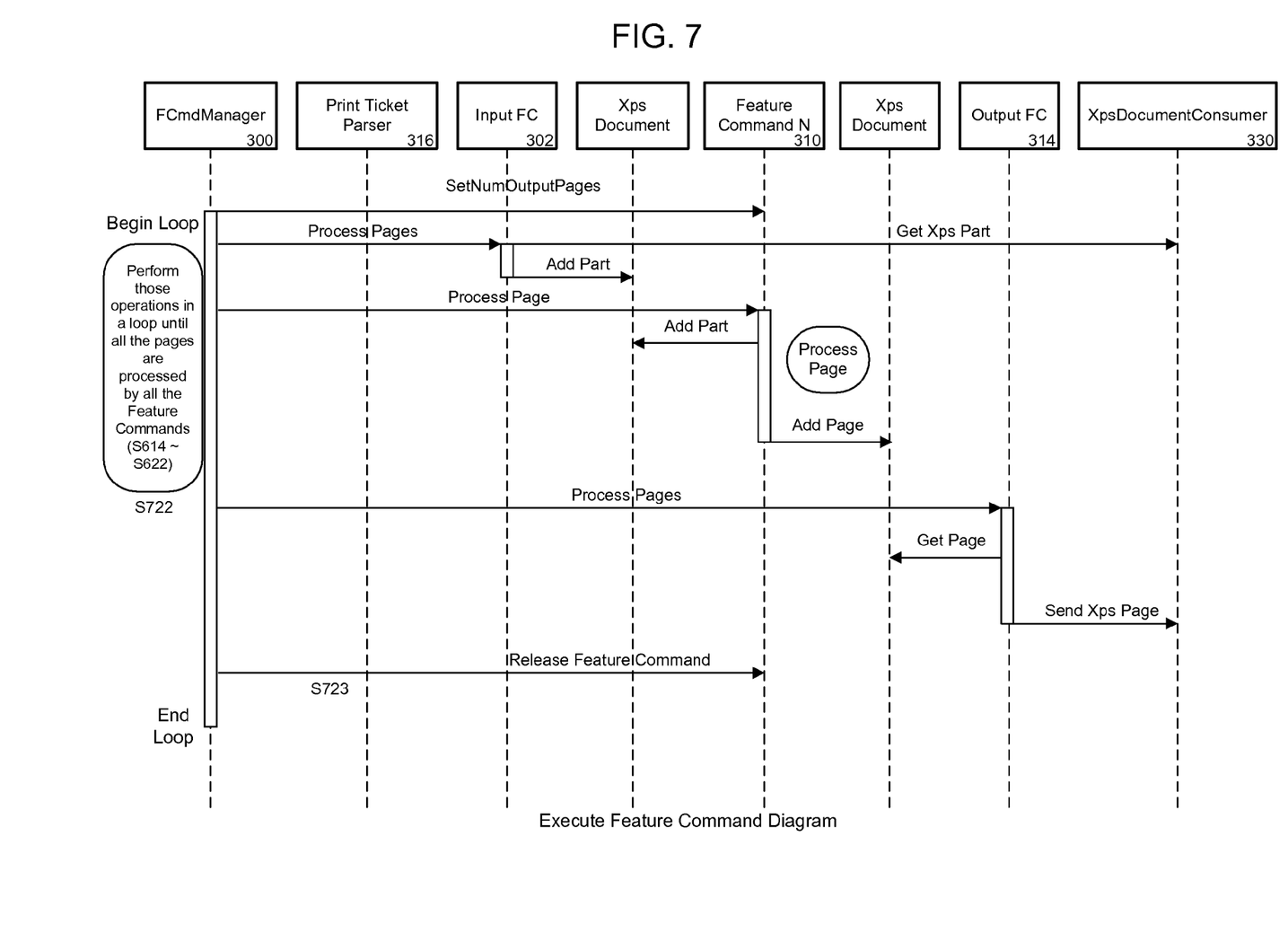
FIG. 7 illustrates an exemplary Execute Feature Command Sequence, according to an aspect of the present invention.

FIG. 7 illustrates an exemplary Execute Feature Command Sequence, according to an aspect of the present invention. In step S722, the execution of all the Feature Commands in the FCM 300 Feature Command List 332, including steps S614 through S621 (from FIG. 6), are repeated until all the pages in the document have been processed by the Feature Commands. Then, in step S723, the FCM 300 removes all the Feature Commands in the list that has document scope when the document processing is completed.

After the Feature Command Sequence is performed, step S408 is performed which repeats steps S405-S407, S508-S513, S614-S621, and S722-S723 until all the documents in the XPS Document has been processed.

[Exemplary Feature Command Applications]

Figure 10A:
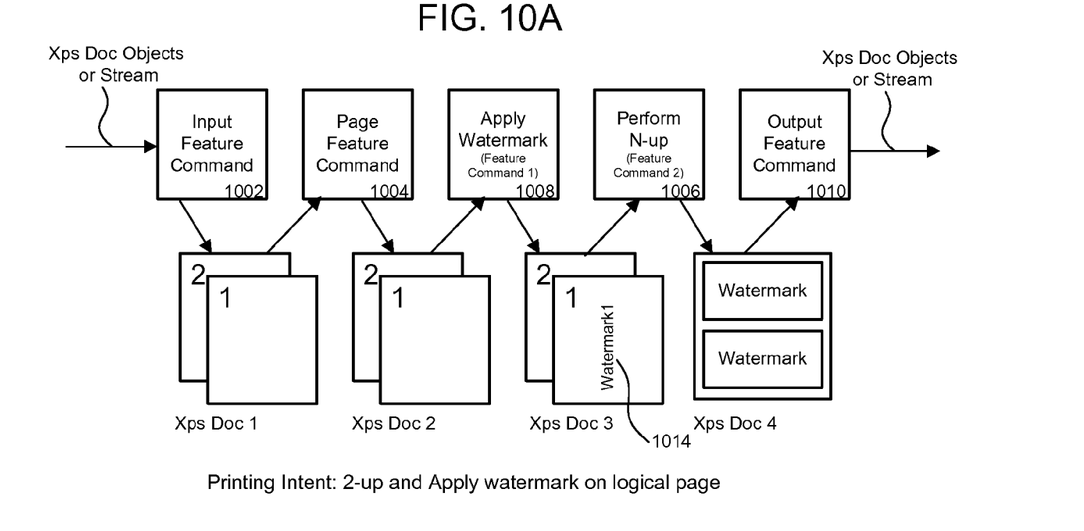
FIGS. 10A-C illustrates exemplary applications of Feature Command function, according to an aspect of the present invention.
Figure 10B:
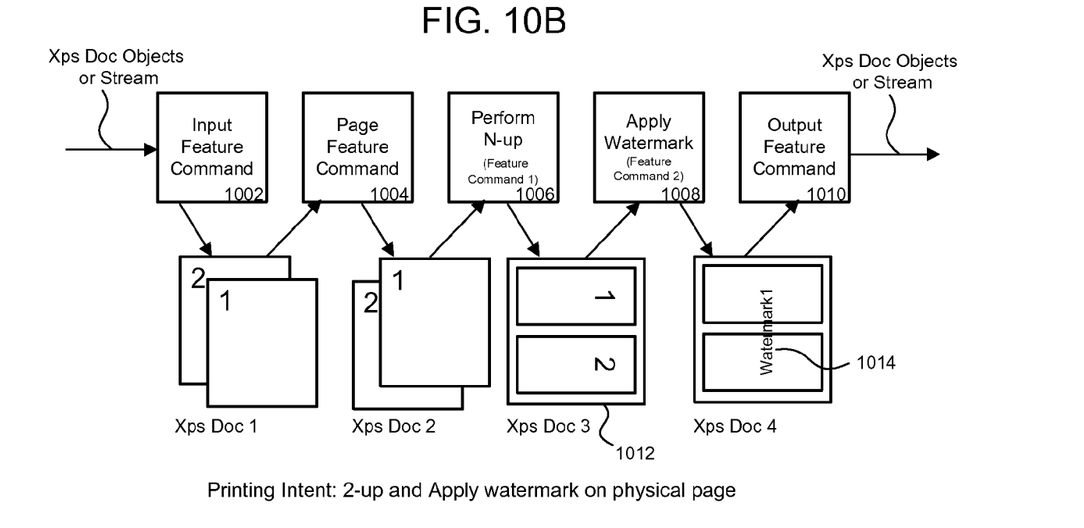
Figure 10C:
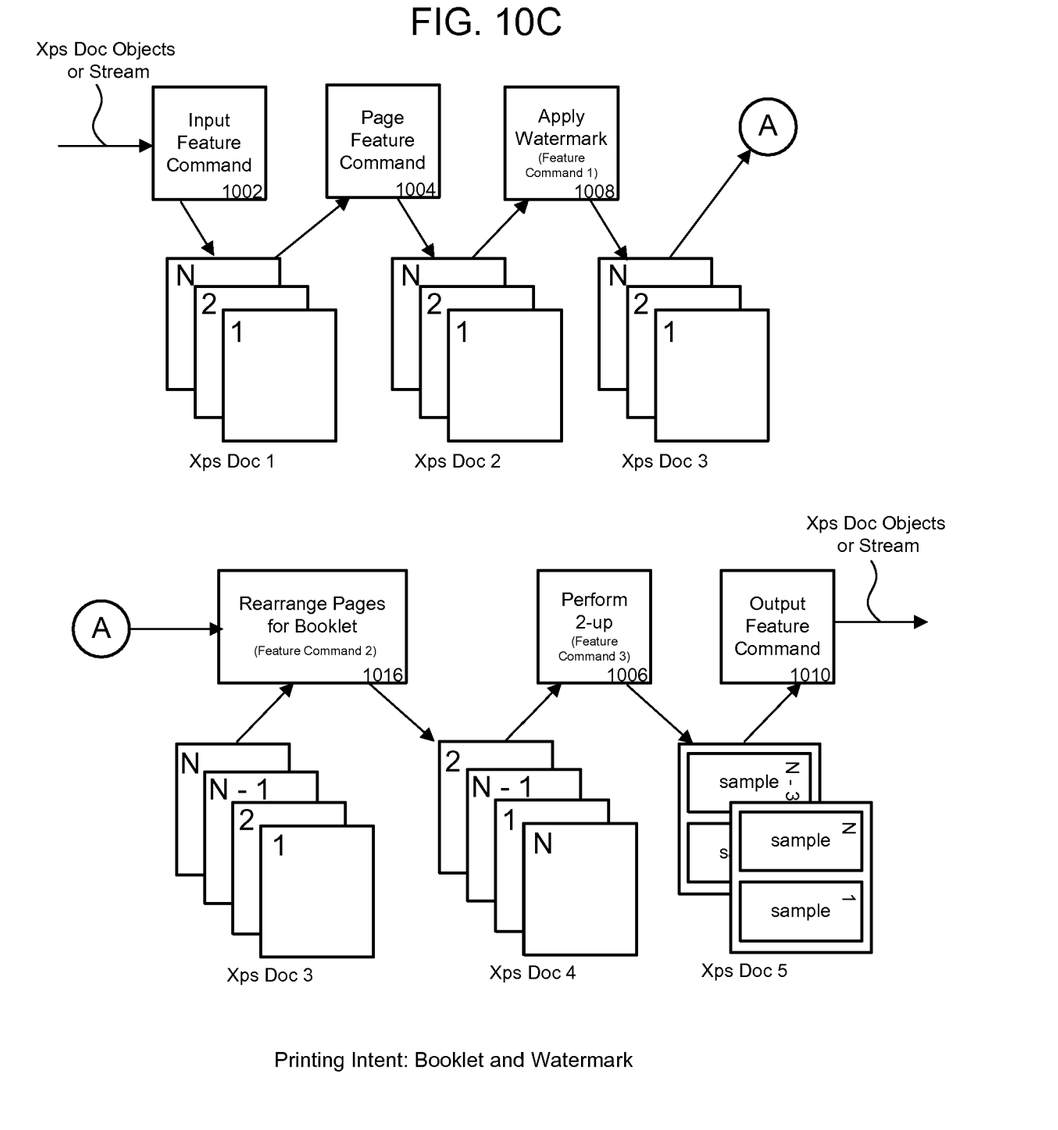

The following section provides several exemplary Feature Command applications (i.e. printing intent) for explanatory/illustrative purposes. FIGS. 10A-C illustrate exemplary applications of Feature Command function, according to an aspect of the present invention.

2-Up & Apply Watermark on Logical Page

FIG. 10A is provided to illustrate an exemplary 2-Up & Apply Watermark on Logical Page Feature Command function, according to an aspect of the present invention.

User printing intent, Job 2-Up, is specified in the Fixed Document Sequence Print Ticket 142 of the XPS Document and a Watermark option is specified in the Page Print Ticket 146 of each page. The Feature Command Manager 300 creates an Input Feature Command 1002 and initializes with an input and output XPS document and starts executing the Feature Commands in the Feature Command List 332 created for the specific job. The Input Feature Command 1002 processes the specified number of pages and returns control back to Feature Command Manager 300 which invokes the Print Ticket Parser 316 to parse the Fixed Document Sequence Print Ticket 142. Here, the Print Ticket Parser 316 adds a Page Feature Command 1004, if one has not been added already. When the Print Ticket Parser 316 detects the Job 2-Up feature in the Print Ticket 142, it creates Job 2-Up Feature Command 1006 (or N-Up) and adds it to the Feature Command List 332. Further, the Page Feature Command 1004 creates a Page Feature Command List 324 which maintains the Feature Command List that will be applied to the individual page. When the Page Feature Command 1004 receives the Print Ticket 146, it invokes the Page Command List 318 to parse the Page Print Ticket 146 and adds a Watermark Feature Command 1008 in the Page Feature Command List 324. When the Feature Commands in the Page Feature Command List 324 are executed, the Watermark Feature Command 1008 applies the watermark 1014 operation on the source page. On receiving 2 pages in a Job 2-Up command, it will perform 2-Up on incoming pages and sends out one page to its output XPS Document. Then, output of the 2-Up (or N-Up) Feature Command 1006 is passed to the last command, an Output Feature Command 1010, which sends out either PDL stream or XPS interface objects.

2-Up & Apply Watermark on Physical Page

FIG. 10B is provided to illustrate an exemplary 2-Up & Apply Watermark operation on Physical Page Feature Command function, according to an aspect of the present invention.

User printing intent, 2-Up and Apply Watermark on a physical page, is specified in the Fixed Document Sequence 140 Print Ticket 142. Upon receiving a parse print ticket event from the Feature Command Manager 300, the Print Ticket Parser 316 parses the Fixed Document Sequence 140 Print Ticket 142 and creates in sequence a Page Feature Command 1004, an N-Up Feature Command 1006, and a Watermark Feature Command 1008 with job scope. So here, the N-Up will be applied by the N-Up Feature Command, combining Page 1 and Page 2, creating one physical page 1012. Then, the watermark 1014 will be applied by the Watermark Feature Command 1008, to this resulting physical page. This process will continue until all the pages in the document have been processed.

Booklet & Watermark

FIG. 10C is provided to illustrate an exemplary Booklet & Watermark Feature Command function, according to an aspect of the present invention.

User intent and Apply Watermark is specified in the Print Ticket 146 of each page and booklet is specified in the Fixed Document Sequence 140 Print Ticket 142. Upon receiving the parsed Fixed Document Sequence Print Ticket event from the FCM 300, the Print Ticket Parser 316 creates a Page Feature Command 1004, a Rearranging-Pages Feature Command 1016, a 2-Up Feature Command 1006, and an Output Feature Command 1010. While processing the Page Feature Command 1004, create Page Command List 318 will be invoked when it receives the Page Print Ticket 146. The Page Command List 318 creates a Watermark Feature Command 1008 and adds it to the Page Command List 318. So therefore, a watermark 1014 is applied to each logical page. Also, the Rearranging-Pages Feature Command 1016 receives the output of the Page Feature Command 1004 and rearranges the pages, and when it has enough pages, it sends the output to the 2-Up Feature Command 1006. Then, output of the 2-Up (or N-Up) Feature Command 1006 is passed to the last command, an Output Feature Command 1010, which sends out either PDL stream or XPS interface objects.

Other Exemplary Embodiments

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The embodiments described above current describes using Microsoft's IXpsDocumentProvider and IXpsDocumentConsumer as input and output interfaces respectively. However, Microsoft also provides IPrintReadStream and IPrintWriteStream as input and output interfaces for the filters. Nevertheless, the present invention also applies for the usage IPrintReadStream and IPrintWriteStream without any change to the core flow described above.

The functions described above can be implemented by a host computer according to a program installed from outside. In that case, the present invention is applicable to a case where information including programs is supplied from a storage media, such as a CD-ROM, a flash memory, and an FD, or from an external storage medium through the network.

A storage medium storing program code of software that executes the functions of the above-described embodiments can be supplied to a system or an apparatus. Then, an aspect of the present invention can be achieved by reading and executing the program code stored on the storage medium by a computer (alternatively, a CPU or an MPU) of the system or apparatus.

In this case, the program code itself read from the storage medium can achieve the functions of the above-described embodiments, and the storage medium storing the program code configures the present invention. Accordingly, any form of program can be used as long as it has a program function, such as object code, a program executed by an interpreter, and script data supplied to an OS.

The storage medium for supplying a program includes, for instance, a flexible disk, a hard disk, an optical disk, a magnet-optical disk, an MO, a CD-ROM, a CD-R, a CD-W, a magnetic tape, a nonvolatile memory card, a ROM, and a DVD.

Besides, as a method of supplying the program, a browser of a client computer can be used to connect to a web page on the Internet. A computer program according to the present invention can be supplied from the web page. Alternatively, the computer program can be supplied from a compressed file including an automatic installation function downloaded into a storage medium such as a hard disk.

Moreover, program code that constitutes a program according to the present invention can be divided into a plurality of files, and each file can be downloaded from different web pages. In other words, a WWW Server or an FTP server allowing a plurality of users to download the program file for achieving the functional processes of the embodiments in a computer is included in the scope of the present invention.

Moreover, the program according to the present invention can be encrypted and stored on a storage medium such as a CD-ROM to be distributed to users. Then, a user who meets a predetermined condition is allowed to download key information for decryption from a web page via the Internet. The user can install and execute the encrypted program using the key information.

Moreover, with program code read and executed by a computer, not only the functions of the embodiments are achieved but also an OS operating on the computer can perform all of or part of the actual processing based on the instruction of the program code. The functions of the embodiments are achieved by the processes described above.

In addition to that, program code read from a storage medium is written to a memory provided in a function extension board inserted in a computer or a function extension unit connected to a computer. Then, a CPU provided in the function extension board or the function extension unit performs all of or part of the actual processing based on the instruction of the program code. The functions of the embodiments are achieved by the above-described processes.

What is claimed:

1. A method executed by a processor in an apparatus having a print job, the method comprising:
 via the processor, executing the following steps,
 getting and parsing a document sequence print ticket for a document sequence for the print job;
 creating a feature command list of document sequence scoped feature commands based on the document sequence print ticket;
 getting a document part and parsing a document print ticket for the document part;
 inserting document scoped feature commands, based on the document print ticket, in the front of the feature command list as a filter of the printer driver;
 getting a page part and parsing a page print ticket for the page part;
 inserting page scoped feature commands, based on the page print ticket, in the front of the feature command list as a filter of the printer driver;
 sequentially executing the feature commands in the feature command list;

removing the paged scoped feature commands from the feature command list before processing of the print job is completed, when the page scoped feature commands are executed;

determining whether there are any more page parts that need to be processed; and removing the document scoped feature commands from the feature command list before processing of the print job is completed, when there are not any more document parts that need to be processed.

2. The method according to claim 1,
wherein a dynamic feature command filter unit functions as an interface with the print driver; and
wherein a feature command manager functions as an interface with the dynamic feature command filter.

3. The method according to claim 2, wherein the feature command manager implements the pseudo-multithread infrastructure using feature commands that are processable in parallel.

4. The method according to claim 3, wherein the feature commands comprise at least one of an input feature command, a page feature command, a feature command having a specialized function, and an output feature command.

5. The method according to claim 1, wherein the printer driver is an XPSDrv print driver including an XPSDrv filter pipeline utilized within a Microsoft® Windows® operating system.

6. The method according to claim 1, further comprising: dynamically reconfiguring the feature command list during processing based on the print ticket settings.

7. The method according to claim 1, further comprising: configuring a "time slice" for each feature command based on a number of pages required by a subsequent feature command.

8. A computer readable medium containing computer-executable instructions for executing a method in an apparatus having a print job, the computer readable medium comprising:

computer-executable instructions for getting and parsing a document sequence print ticket for a document sequence for the print job;

computer-executable instructions for creating a feature command list of document sequence scoped feature commands based on the document sequence print ticket;

computer-executable instructions for getting a document part and parsing a document print ticket for the document part;

computer-executable instructions for inserting document scoped feature commands, based on the document print ticket, in the front of the feature command list as a filter of the printer driver;

computer-executable instructions for getting a page part and parsing a page print ticket for the page part;

computer-executable instructions for inserting page scoped feature commands, based on the page print ticket, in the front of the feature command list as a filter of the printer driver;

computer-executable instructions for sequentially executing the feature commands in the feature command list;

computer-executable instructions for removing the paged scoped feature commands from the feature command list before processing of the print job is completed, when the page scoped feature commands are executed;

computer-executable instructions for determining whether there are any more page parts that need to be processed; and computer-executable instructions for removing the document scoped feature commands from the feature command list before processing of the print job is completed, when there are not any more document parts that need to be processed.

9. The computer readable medium according to claim 8,
wherein a dynamic feature command filter unit functions as an interface with the print driver; and
wherein a feature command manager functions as an interface with the dynamic feature command filter.

10. The computer readable medium according to claim 9, wherein the feature command manager implements the pseudo-multithread infrastructure using feature commands that are processable in parallel.

11. The computer readable medium according to claim 10, wherein the feature commands comprise at least one of an input feature command, a page feature command, a feature command having a specialized function, and an output feature command.

12. The computer readable medium according to claim 8, wherein the printer driver is an XPSDrv print driver including an XPSDrv filter pipeline utilized within a Microsoft® Windows® operating system.

13. The computer readable medium according to claim 8, further comprising:
computer-executable instructions for dynamically reconfiguring the feature command list during processing based on the print ticket settings.

14. The computer readable medium according to claim 8, further comprising:
computer-executable instructions for configuring a "time slice" for each feature command based on a number of pages required by a subsequent feature command.

* * * * *